J. DODGE.
Coffee Pot.
No. 96,558.  
Patented Nov. 9, 1869.
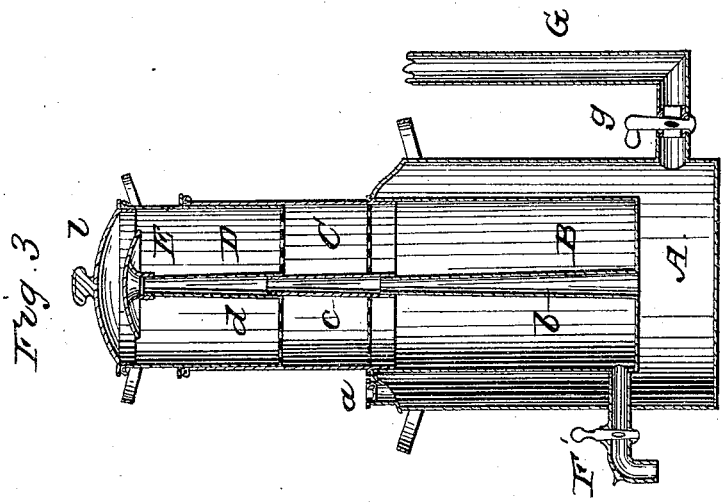
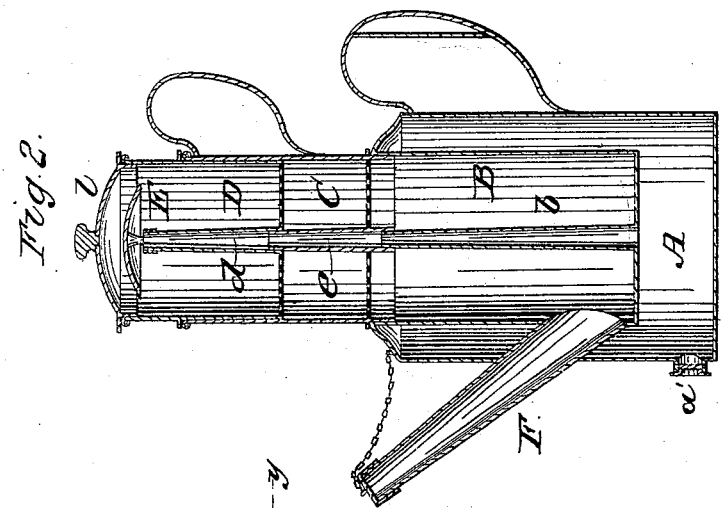
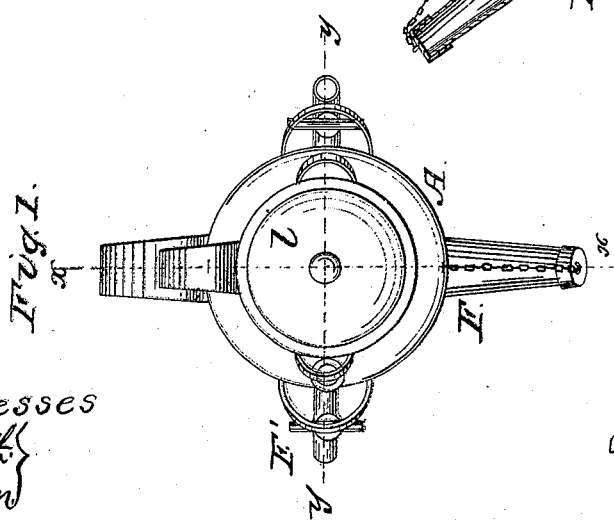
Witnesses  
G. A. Smith  
E. R. Brown
Inventor  
Johnson Dodge  
By T. C. Theaker  
his attorney.

UNITED STATES PATENT OFFICE.

JOHNSON DODGE, OF NEW ORLEANS, LOUISIANA.

Letters Patent No. 96,558, dated November 9, 1869.

COFFEE POT.

The Schedule referred to in these Letters Patent and making part of the same.

*To all whom it may concern:*

Be it known that I, JOHNSON DODGE, of New Orleans, parish of Orleans, and State of Louisiana, have invented a new and useful Steam Coffee-Maker; and I do hereby declare that the following is a full, clear, and exact description thereof, reference being had to the accompanying drawings, making part of this specification, and to the letters of reference marked thereon.

The nature of my invention consists in—

First, an outer chamber for holding water, for the purpose of generating steam for making coffee.

Second, an inner chamber, for holding the coffee after it is made.

Third, a perforated cup, or filter, for holding the ground coffee.

Fourth, conducting steam from a steam-boiler, for the purpose of making coffee.

Fifth, a pipe and deflector, for bringing the steam in contact with the ground coffee.

To enable those skilled in the art to which my invention appertains, to make and use the same, I will proceed to describe its construction and operation.

In the drawings—

Figure 1 is a top view of my improved coffee-maker.

Figure 2 is a vertical section, taken in the line $x$ $x$, fig. 1.

Figure 3 is a vertical section, taken in the line $y$ $y$, fig. 1.

A represents the outer chamber, which is made in the form of an ordinary coffee-pot.

It is provided with an inner chamber, B, the top of which is securely soldered to the top of the outer chamber.

C is a cup, which is made to fit in the top of the chamber B, and the bottom of which is perforated, so as to form a filter.

D is another cup, which is made to fit in the cup C, and the bottom of which is also perforated.

Projecting upward from the bottom of the inner chamber B is a tube, $b$, both ends of which are open; and the cups C and D are provided in a similar manner with tubes $c$ and $d$. These tubes correspond in size, so that the upper end of one tube fits the lower end of the tube next above it.

E is a deflector, consisting of a concavo-convex plate, provided with a socket or other suitable means for attaching it to the upper end of the tube $d$ or the tube $c$.

The outer chamber A is provided with a screw-tap, or plug, $a$, at the top, for introducing the water, and another, $a'$, at the bottom, for drawing off the water.

The inner chamber B may be provided with a spout, F, as shown in fig. 2, or a faucet, F', as shown in fig. 3, or both spout and faucet, as shown in fig. 1.

G represents a pipe leading from a steam-boiler to the outer chamber A.

It is provided with a stop-cock, $g$, for shutting off the steam, when desired.

This pipe G is attached by means of a screw-joint, so that it can be removed when desired, and the opening filled by a tap or plug.

The operation is as follows:

The water is placed in the outer chamber A, and the ground coffee in the cup C. The cup D is placed on the cup C, and the deflector E placed in position on the upper end of the tube $d$. The lid $l$ is then placed on the cup D, and the apparatus is set on the fire.

When steam is generated, it rises through the tubes $b$ $c$ $d$, to the deflector E, and thence passes down through the cups C and D, extracting the strength from the ground coffee in the cup C, and is condensed and deposited as liquid coffee in the inner chamber B.

Instead of placing water in the outer chamber, from which to generate steam, connection may be made with a steam-boiler by means of a pipe, through which the steam may be conducted directly to the outer chamber, as shown at G, fig. 3.

This form of construction is not intended for family-use, but for large establishments, such as hotels, steam-boats, &c., where coffee is made in large quantities. When made in this form, the steam-pipe may be allowed to enter the lower end of the tube $b$, if desired. The outer chamber A, or the lid $l$, may be provided with a safety-valve, to allow the escape of steam in the event of the pressure becoming too great. In such case, when a sufficient quantity of coffee has been made, the lid $l$ may be removed, and the deflector E replaced by a screw-tap or plug, so as to retain sufficient steam in the chamber A to keep the coffee hot.

The upper cup D may be dispensed with, if desired, and the deflector placed on the upper end of the tube $c$; but I prefer to use the upper cup, as it prevents the ground coffee from rising too high, in the event of the liquid in the inner chamber becoming heated to the boiling-point.

What I claim as new, and desire to secure by Letters Patent, is—

A steam coffee-maker, provided with an outer chamber for holding water, a perforated cup, or filter for holding the ground coffee, and an inner chamber or receptacle for the liquid coffee, when constructed and operating substantially as shown and described.

JOHNSON DODGE.

Witnesses:
A. CARPENTER,
JOHN WILSON.